FIG. I

Albert Baumann
Erwin Grube
INVENTORS

AGENT

Albert Baumann
Erwin Grube
INVENTORS

Dec. 26, 1961 A. BAUMANN ET AL 3,014,573
CONVEYOR SYSTEM WITH STATION SELECTOR
Filed Dec. 4, 1959 4 Sheets-Sheet 4

Albert Baumann
Erwin Grube
*INVENTORS.*

BY

*Karl F. Ross*

AGENT.

United States Patent Office 3,014,573
Patented Dec. 26, 1961

3,014,573
CONVEYOR SYSTEM WITH STATION
SELECTOR
Albert Baumann, Im Siekerfelde 12, Bielefeld, Germany,
and Erwin Grube, 188, Bielefeld-Ubbedissen, Germany
Filed Dec. 4, 1959, Ser. No. 857,402
Claims priority, application Germany Feb. 14, 1958
20 Claims. (Cl. 198—38)

Our present invention relates to a distributor system serving a plurality of work stations to which various loads, such as containers holding articles to be processed, are selectively supplied by means of a common conveyor.

In U.S. Patent No. 2,901,082, issued August 25, 1959, to Albert Baumann (one of the present applicants), there is disclosed a system of this general type in which each work station is provided with a release mechanism for causing the discharge of a passing load from the conveyor, all of these mechanisms being selectively operable from a control station by a supervisor who visually determines that a particular load is approaching the selected station. The patented system, however, is suitable only for relatively small installations where the supervisor can readily oversee the entire conveyor path and where the necessary re-routing of loads through the control station, on their passage from one work station to another, presents no serious inconvenience.

An improved distributing system of the same general character is disclosed in commonly assigned application Ser. No. 767,463, filed by said Albert Baumann jointly with Helmut Bünten on October 15, 1958. In this latter system the several load-carrying platforms of the conveyor are provided with individually presettable station selectors adapted to co-operate with stationary control devices at the several work stations; whenever a work station is approached by a load carrier having a selector preset in accordance with the characteristic adjustment of the controller at that station, the corresponding release mechanism is actuated to discharge the load from the carrier. The selector setting of any carrier can be readily altered by a work-station operator in accordance with the new destination of a load which has been partially processed at that operator's station.

The selector specifically disclosed in the aforementioned application comprises a series of pins offset from one another in a direction transverse to the direction of conveyor movement. The controller at each station includes a pair of contacts positioned in the path of one or another of these pins so that, if the corresponding pin is displaced from a retracted to a projecting position, the contacts will close momentarily to operate the release mechanism. The number of pins adapted to be thus accommodated along the transverse side of a carrier is, however, quite limited so that only a relatively small number of stations can be effectively served by a system of this type.

It is, therefore, an object of our present invention to provide an improved carrier-borne selector mechanism for conveyor systems of the type referred to, designed to enable individual selection of any one of a large number of associated stations serving as potential destinations for a plurality of loads.

Attempts at increasing the number of available selections through the establishment of a multi-digit code, in which each destination is indicated by the simultaneous displacement of a plurality of pins or the like, have hitherto been met with only partial success in view of the complexity of the decoder system which must be provided at each station. Moreover, the use of unconventional code combinations requires reference to a chart or the like whenever an operator desires to select a station normally identified by its numerical position along the conveyor path. Similar difficulties exist if a supervisor desires to ascertain the destination of a particular load by glancing at the selector of its carrier.

It is, accordingly, another object of this invention to provide an improved multi-digit selector for the purpose described which utilizes the conventional decimal system to facilitate both the setting and the reading of its indication of destination.

It is also an object of the present invention to provide blocking means for temporarily disabling the selector of a carrier passing a work station whenever a load is already present in a receiving position at such station, thereby preventing the release of another load under these conditions.

A further object of our invention is to provide improved testing means, adapted to co-operate with a digital selector of the character set forth, so designed as to enable the movable selector elements to be predominantly arrayed in the longitudinal rather than the transverse direction of the load carrier in order to afford better accessibility and greater economy of space.

In accordance with a feature of our invention we provide, in a distributing system having a plurality of load carriers attached to a common conveyor, a carrier-borne selector comprising preferably two longitudinally extending rows of individually displaceable elements, this selector co-operating with a stationary controller including a test pattern in which there is present for each row of the selector a test element whose position, at a particular instant during the passage of the load carrier, is opposite a particular selector element of the respective row. Whenever a carrier passes the controller of any station in its path, it operates a movable test-pattern support in the controller whereby, in a predetermined relative position of selector and controller, the test pattern is momentarily moved toward the selector to establish the presence or absence of correspondence between the positions of the test and selector elements. If such correspondence exists, the test pattern is rendered operative to actuate a release mechanism for discharging the load from the carrier, e.g. by mechanical or electromagnetic means.

Advantageously, in accordance with another feature of the invention, the carrier is provided with a sloping surface on which the load, such as a container for raw or semi-finished goods to be processed, rests against a retractable stop. When the controller ascertains the presence of a matching selector setting, this stop is momentarily withdrawn to enable a sliding of the load onto an adjacent receiving surface forming part of a work station served by the conveyor. The receiving surface, in keeping with a further feature of our invention, may be provided with a feeler adapted to be depressed by the load and, when in this condition, to inactivate the controller (e.g. by keeping the test pattern out of reach of the selector) so that no further load can be deposited on this surface.

For the purpose of determining the exact moment of approach between test pattern and selector, the load carrier and the test-pattern support may be provided with co-operating camming members designed to keep the test pattern out of the path of the selector elements, against a suitable restoring force, during the entire passage of the carrier with the exception of one brief instant when the test pattern and the selector are properly aligned. The test-pattern support, in a preferred embodiment, comprises a swinging frame pivotally secured to the conveyor bed underneath the path of the carriers and urged upwardly by a spring. An extension of this frame may form the aforementioned feeler which, on being depressed by the load, prevents the frame from rising high enough to complete the test approach.

The invention will be described in further detail with reference to the accompanying drawing in which.

Figure 1:
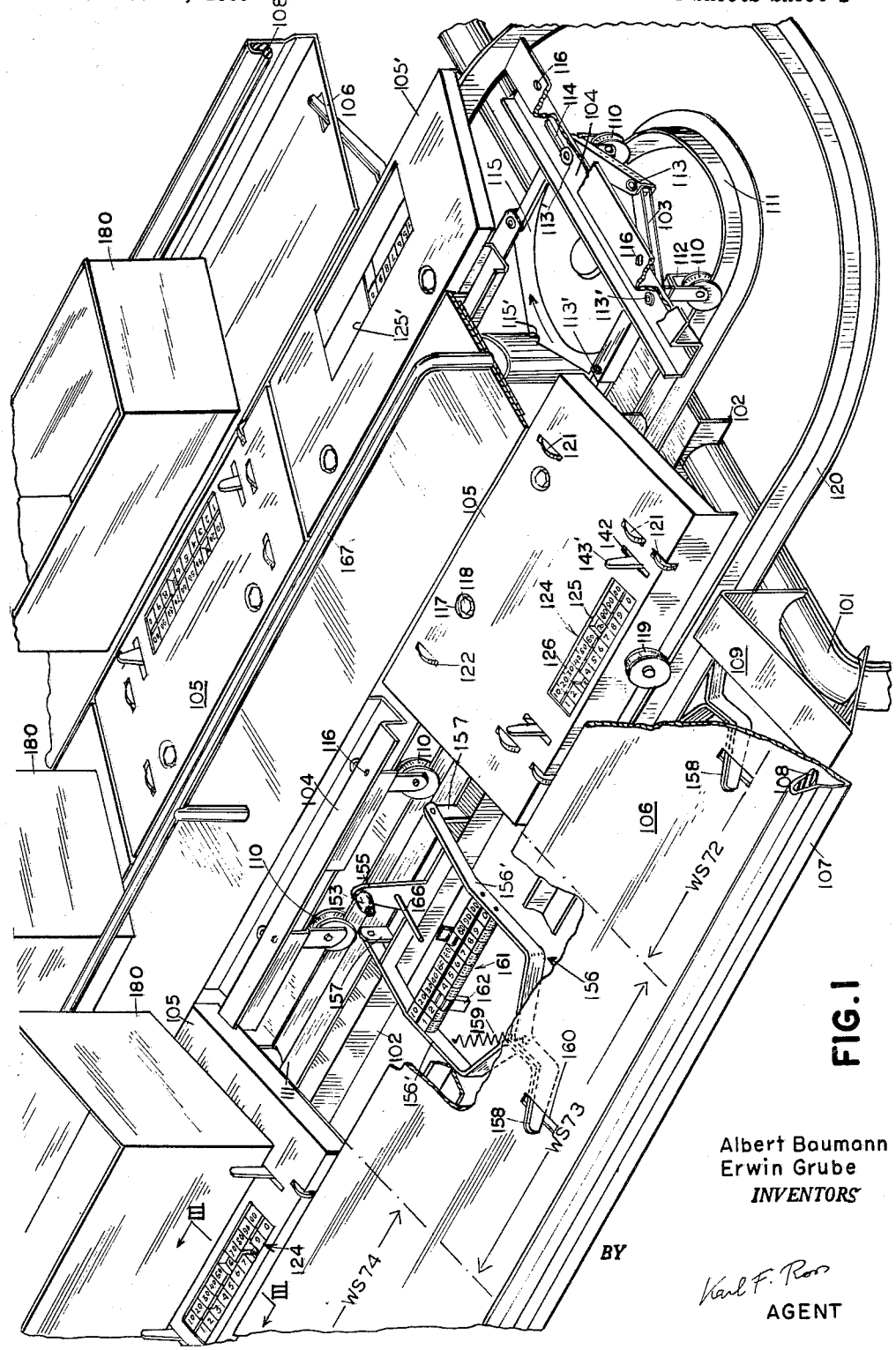
FIG. 1 is a perspective view of a representative portion of a conveyor system embodying the present improvement.

Reference will first be made to the embodiment illustrated in FIGS. 1–4. The conveyor system there shown is supported by a bed consisting essentially of tubular legs 101 which are spanned by longitudinally extending beams 102. This bed supports an endless conveyor member 103 in the form of a sprocket chain which is wound around and driven by a pair of deflecting wheels 115 (only one shown) having notches 115' to receive the link pins 113 of the chain. The conveyor 103 is further provided with supporting rollers 110 which ride on a guide rail 111; the rollers 110 are journaled in trucks 112 which are pivotable about certain link pins 113' suitably extended for this purpose. These extended pins 113' also serve as means for attaching to the conveyor, at regular intervals, a series of brackets 104 which are each secured to the chain 103 by two such pins respectively passing through a round hole (not visible) and a slot 114 in such bracket. The presence of slot 114 facilitates the relative angular displacement of the chain links in their passage around wheel 115; this in turn permits this wheel to be made of small radius, with a consequent saving of space.

Figure 4:
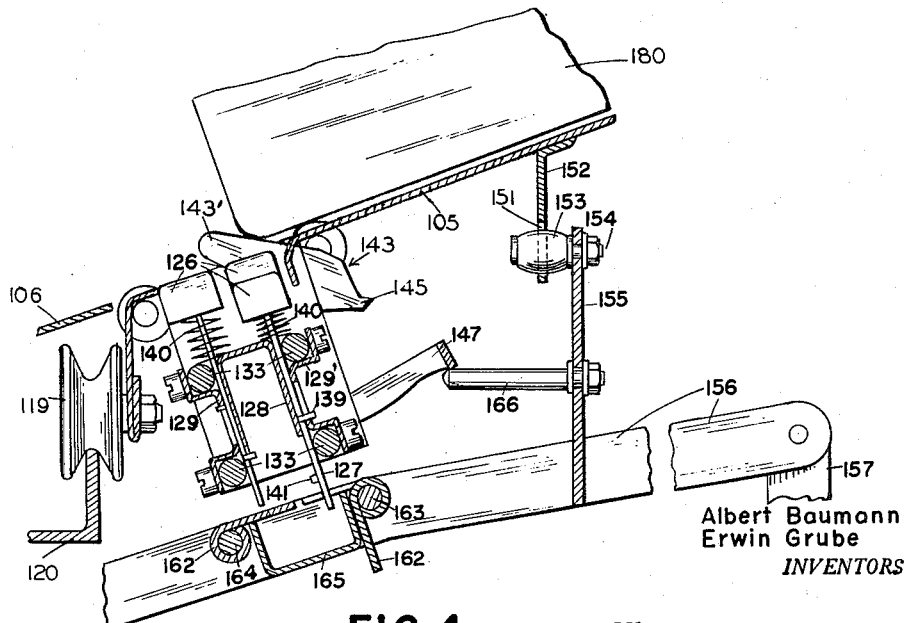
FIG. 4 is a view similar to FIG. 3, showing a selector and a controller engaged in a successful test approach.

Fixedly entrained by each bracket 104 is a respective load carrier 105 which slopes downwardly and outwardly from the conveyor 103 toward a further guide rail 120 on which the carrier rides by means of a roller 119. Beyond rail 120 there extends on each side of the conveyor, and over substantially the entire length thereof, a receiving surface 106 each common to a plurality of work stations located thereat. The receiving surface 106 is approximately co-planar with the load-supporting topside of carrier 105, as best seen in FIG. 4, and terminates at its lower edge in a ledge 107 which is padded with a rubber strip 108; the sheet-metal plate constituting the parts 107, 108 is supported by stays 109 resting on the legs 101.

Figure 2:
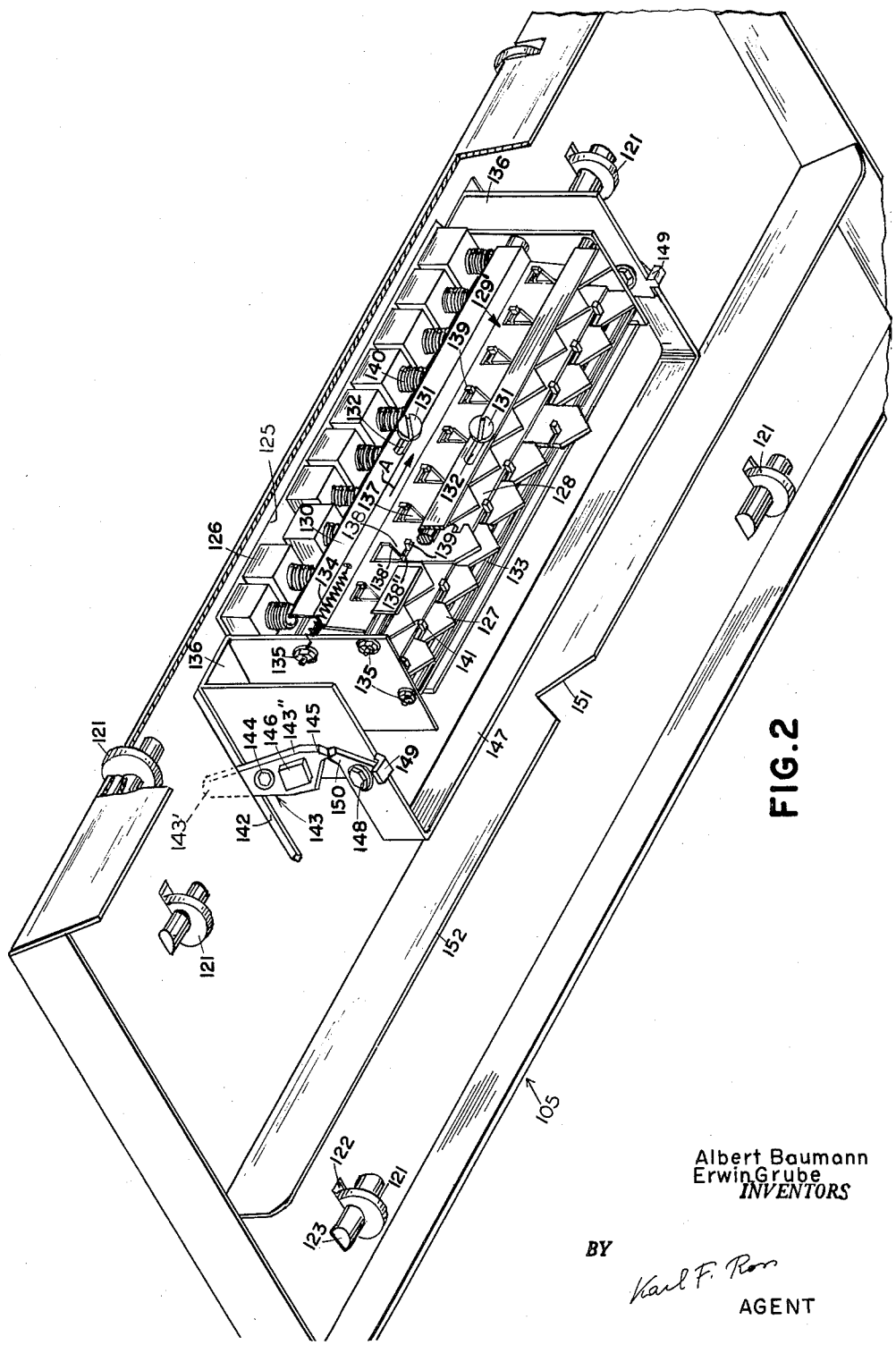
FIG. 2 is a perspective bottom view of a carrier (parts broken away) forming part of the system of FIG. 1.
Figure 3:
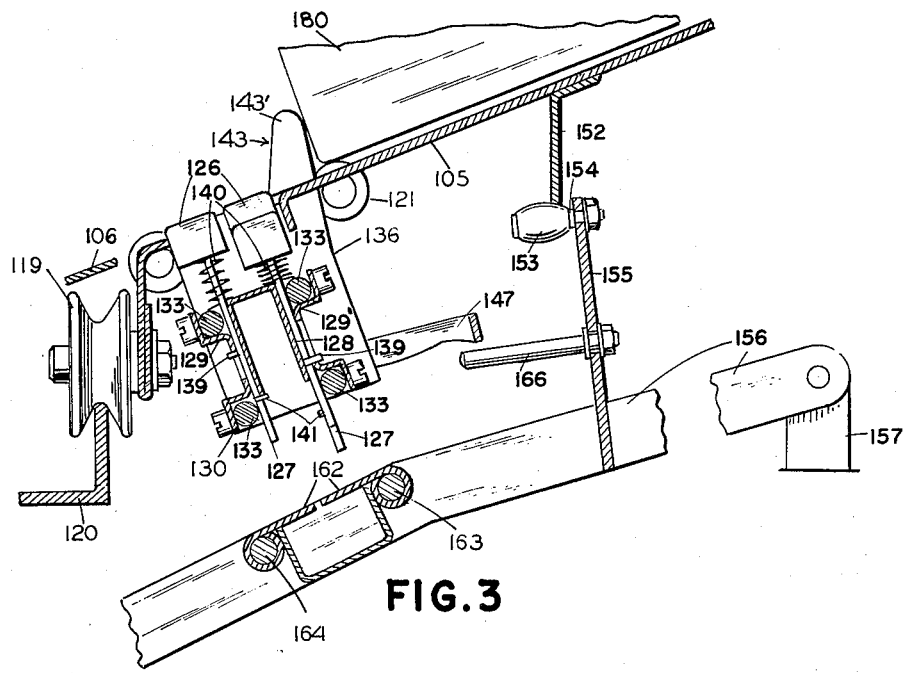
FIG. 3 is a fragmentary sectional view taken on the line III—III of FIG. 1, showing a selector and a controller in relatively aligned positions just prior to an unsuccessful test approach.

The connection between brackets 104 and carriers 105 is effected by means of threaded bores 116 which are provided in these brackets to receive screws 118 countersunk in recesses 117 of the carrier. The latter, which is in the form of an inverted tray, has anti-friction rollers 121 projecting upwardly through slots 122 in order to support a load 180, such as a cardboard container, adapted to be slidably deposited on these carriers. The rollers 121 are rotatable about pins 123 secured to the underside of the carrier, as illustrated in FIG. 2. The provision of these rollers enables a substantial reduction of the angle of inclination of the sloping carrier surface.

It will be assumed that the receiving surfaces 107 accommodate one hundred work stations of which some, arbitrarily designated WS72, WS73 and WS74, have been shown in FIG. 1 separated by imaginary boundaries indicated by dot-dash lines. The extent of each work station along the conveyor path is substantially equal to the length of a carrier 105, these carriers following one another with very little spacing so that, at certain intervals in the operating cycle, each carrier is opposite a respective work station. Since it is desired that any carrier be capable of delivering a load 180 to any one of these stations, each carrier is provided with a respective selector 124 adjustable to one-hundred digital values. The selector has a window 125 through which two parallel rows of pushbuttons 126 are accessible from without. The outer row of pushbuttons, closer to the operator, contains the units digits 1 through 0 whereas the inner row features the tens digits 10 through 00. Any of one-hundred station-designating numerals may be chosen by the simultaneous depression of two pushbuttons, one from each row, including the "00" button of the tens row for the digits 1 to 9 and the "0" button of the units row for the decades 10, 20 etc. The one-hundredth work station is designated by the combination "00" and "0."

Each pushbutton 126 is provided with an individual selector element in the shape of a downwardly pointing dagger 127. The two sets of daggers 127 are slidable in a generally vertical direction between the flanges of a channel bar 128, of inverted U-shape, and respective lock-out bars 129, 129' which are also substantially U-shaped in profile and have their legs bent outwardly at 130 to embrace two pairs of connecting rods 133. The rods 133 extend horizontally between two brackets 136 which depend from the carrier 105, their threaded extremities being engaged by nuts 135; the bars 129, 129' are slidably mounted on the rods 133 by means of screws 131 which pass through slots 132 in the bent-over edge portions 130 thereof, these slots enabling the bars to be displaced toward the right (as viewed in FIG. 2) against the force of restoring springs 134 of which only the one associated with bar 129' is visible.

The web portions of the lock-out bars 129, 129' are each provided with ten windows 137 forming triangular projections 138. The daggers 127, which are urged upwardly along with the associated pushbuttons 126 by respective springs 140, are provided with outwardly projecting upper and lower lugs 139, 141 of which the former pass through the windows 137 whereas the latter normally bear upon the lower edges of channel bar 128. The lugs 139, best seen in FIG. 2, are in the upper right-hand corner of the respective windows 137 when the associated buttons 126 are unoperated; when a pushbutton 126 is depressed, as best illustrated for the button bearing the digital indication 3, its lug 139 passes downwardly along the sloping edge 138' of the associated projection 138 to cam the bar 129 or 129' to the right (i.e. in the direction of arrow A), this movement causing the release of any other pushbutton of the same row previously actuated. As soon as the lug 139 clears the projection 138, the lock-out bar is retracted by its spring 134 and the lug comes to rest underneath the lower edge 138" of this projection. In this manner any resetting of the selector 124 will automatically cancel the previous selection.

The carrier 105 is further provided with slots 142 through which project the upper ends 143' of a pair of detent levers 143 which are pivotally secured at 144 to the brackets 136. Each lever 143 carries a weight 146 which tends to maintain it in a substantially vertical position; in this position a dog 145 at the lower end of the lever is engaged by a beak 150 at the tip of a respective arm of a bail 147 which is swingably supported on the brackets 136 by bolts 148. A downward swing of bail 147 beyond the position illustrated in FIG. 2 is prevented by hooks 149 integrally projecting from the brackets 136.

Normally, the bail 147 prevents the detent levers 143 from oscillating in a sense which would allow a load 180 on the carrier to slide downwardly onto receiving surface 106. These levers do not, on the other hand, interfere with the reloading of a carrier by an operator who manually pushes a container 180 from an adjacent work station into the position illustrated in FIG. 3, the lever 143 then swinging in the opposite direction (clockwise in FIG. 3), against the restoring force of its weight 146, until the container has come to rest on the rollers 121 beyond the lever ends 143'.

A blade 152, forming a camming edge with a central notch 151, extends along the underside of carrier 105 over its entire length. Blade 152 co-operates with a roller 153 whose shaft 154 is fastened to an upstanding arm 155 forming part of a swinging frame 156. This frame, whose arms 156' are hinged to ears 157 rising from beam 102, is a constituent element of a controller with which each work station is provided. The forward portions of arms 156' are bent inwardly and joined together into a single arm 158 urged upwardly by a spring 159; the free end of arm 158 extends above the receiving surface 106 through a slot 160.

The controller further comprises a test pattern 161 which is supported on the frame 156 between the arms 156' thereof. The test pattern 161 consists of twenty marking elements 162, individually swingable about two rollers 163, 164, which form two rows of ten elements each and bear the same designations as the corresponding selector elements 126. These markers, when in a non-indicating position, rest on the upper edges of a U-shaped support 165 extending between the rods 163 and 164; usually, however, two such markers (one from each row) will be turned outwardly in order to provide a test-pattern setting representing the two-digit number which identifies the associated work station. Thus, as illustrated in FIG. 1, station WS73 has the markers "70" and "3" deflected outwardly in this manner; one of the markers 162 on rod 163 is also shown so deflected in FIG. 4.

Arm 155 further carries a finger 166 which extends below the bail 147 whenever a carrier 105 passes the controller. At the instant when the roller 153 registers with the notch 151 of such carrier, the elements 162 of the test pattern 161 are exactly aligned with the daggers 127 (in the direction of their displaceability) associated with the elements 126 of its selector. The camming edge of blade 152 has the purpose of swinging the frame 156 away from the selector, i.e. downwardly against the force of spring 159 into the position shown in FIG. 3, before and after the carrier passes this point of alignment. A similar downward swing of the frame occurs, however, whenever a load rests on the receiving surface 106 so as to bear upon the projecting end of arm 158; the presence of such a load will, therefore, prevent the frame from moving clockwise into the position of FIG. 4.

A guard rail 167, shown to extend within the plane of symmetry of the conveyor system, serves as a barrier designed to prevent a container 180 from overshooting a carrier 105 when pushed onto its surface by an operator.

The operation of the system shown in FIGS. 1-4 will now be described.

Let us consider first the carrier which is illustrated at upper left in FIG. 1 and whose selector 124 displays the destination "68". At the instant shown, this selector is operatively aligned with the controller of station WS74 whose markers 162 are set in a non-matching pattern. Thus, as the roller 153 of this controller lines up with the notch 151 of the carrier, the depressed daggers 127 (of which only the tens dagger on the right can be seen in FIG. 3) finds their descent blocked by the corresponding markers 162 of the controller. When this occurs, as also when only one of the selector elements 127 is blocked in this manner, the frame 156 fails to reach the position of FIG. 4 and the detent levers 143 remain latched, the carrier accordingly continuing on its way with its load undisturbed.

At the same time, however, another carrier 105 (shown unloaded in FIG. 1 for the sake of clarity) begins its run past station WS73 whose digital code number corresponds to the destination indicated on the selector 124 of that carrier. As the blade 152 first contacts the roller 153, frame 156 is swung downwardly into the position of FIG. 3. Thereafter, as the roller registers with notch 151, frame 156 rises momentarily into the position of FIG. 4 which it can occupy because each extended dagger 127 faces a hole left by a deflected marker 162. As the frame moves upwardly, finger 166 lifts the bail 147 whose beaks 150 disengage the dogs 145 of levers 143. The load 180, which is now free to rotate the released levers 143 counterclockwise, immediately begins to slide downwardly from carrier 105 onto surface 106 aligned therewith. After the load has passed, the levers 143 are once more erected by their weights 146 and snap into their latched positions, the frame 156 having again descended upon the movement of notch 151 out of alignment with roller 153. With the load now resting on arm 158, no further load can be deposited at station WS73 even if a subsequent carrier should bear the same destination.

If only a single digit of a selector 124 were depressed, the associated carrier would discharge at every station (ten in the present case) which had the same digit in its code. This explains the need for the actuation of pushbuttons "0" and "00" under the circumstances previously mentioned. It is conceivable, on the other hand, that in certain instances the actuation of the release mechanism at more than one station may be desirable. In such event it is, of course, possible to alter the test pattern of a particular station in a manner making it responsive to a variety of selector settings, e.g. by deflecting all the markers of one row along with one or more markers of the other row into indicating position. If all twenty markers are so deflected, or if the test pattern is completely removed, any passing load will be discharged as soon as the previous one has been taken off the receiving surface.

Since, in the arrangement shown, the carriers 105 follow one another with hardly any spacing, it may be desirable to provide a special carrier 105' having an empty window 125' through which the controller of any station may be reset as this carrier passes over it.

Figure 5:
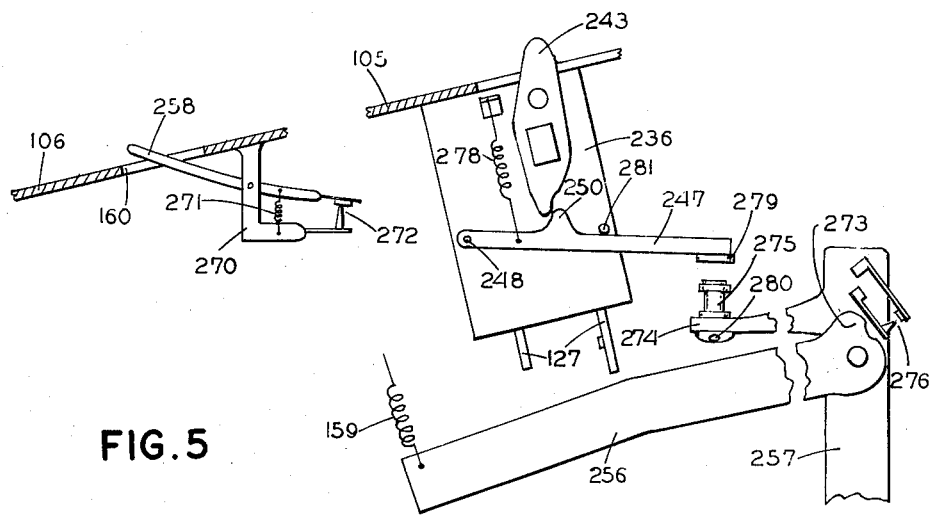
FIG. 5 is a lateral view of a modified controller.
Figure 6:
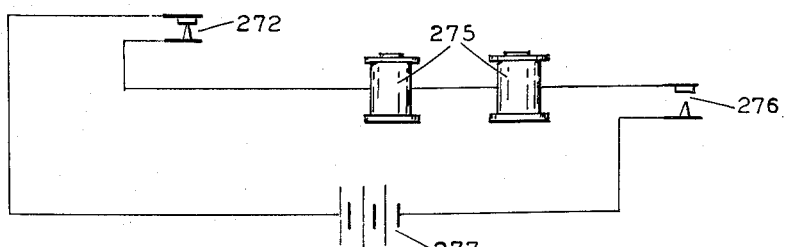
FIG. 6 is a circuit diagram for the controller shown in FIG. 5.

In FIGS. 5 and 6 there has been shown a modified controller and release system in which the tripping of a bail member 247, normally latching the detent levers 243 (only one shown) in load-retaining position, is accomplished by electromagnetic means. Bail 247, pivoted to brackets 236 (only one shown) at 248, is biased upwardly by a spring 278 against a stop 281. The supporting frame 256 of the controller, which is now independent of the load-responsive lever 258 on receiving surface 106, is similarly biased by a spring 159 so as to bear against a stop 280 on a fixed arm 274 when no carrier 105 is aligned with it. It will be apparent that stop 280 plays a role corresponding to that of the slot 160 in the preceding embodiment in limiting the ascent of the frame under the control of its restoring spring.

Arm 274 rises from one of the frame-supporting ears 257, a second such arm (not shown) similarly extending from the other ear. These arms carry, in addition to the stops 280, respective magnets 275 co-operating with armatures 279 on bail 247. The energizing circuit of magnets 275, illustrated in FIG. 6, includes a battery 277, a pair of normally closed contacts 272 and a pair of normally open contacts 276. Contacts 272 are respectively secured to the load feeler 258 and a supporting bracket 270 therefor, these contacts being normally held closed by a spring 271. Contacts 276 are mounted on one of the ears 257 for closure by a cam 273 on frame 256 when this frame is swung, under the conditions previously explained, into an operative position corresponding to that shown in FIG. 4. When this occurs, the circuit of magnets 275 is closed (if no load is resting on surface 106 to open the contacts 272) and the armatures 279 are attracted to lower the bail 247 which, by its humps 250, releases the detent levers 243. The unlatched levers 243 will again be maintained by their weighted lower ends in an erected position in which they can be pushed inwardly by a load moving upwardly onto the carrier surface, the levers 243 thereupon camming the humps 250 aside to restore the position illustrated in FIG. 5.

Reference may be made to co-pending application Ser.

No. 857,353, filed on even date herewith, for further details of the overall organization of a distributing system as herein disclosed; such details, however, are not essential for an understanding of the instant invention.

From the foregoing description it will be apparent that the present invention may be realized in a variety of embodiments which are intended to be included in the scope of the appended claims except as otherwise limited.

We claim:

1. In a distributing system, in combination, a conveyor, a load carrier entrained by said conveyor, a plurality of load-receiving stations each provided with a controller in the path of said carrier, selector means on said carrier adjustable into a plurality of different patterns, said controller including test means pre-set into a pattern matching one of the possible patterns of said selector means, a movable support for said test means, mechanism at each of said stations responsive to the passage of said carrier for momentarily displacing said support into a position of operative alignment between said test means and said selector means, detent means on said carrier adapted to hold a load thereon, and release means at said controller engageable with said detent means during passage of said carrier for tripping said detent means into a load-releasing position, said test means including means actuatable in said position of alignment for operating said release means upon said test means encountering a matching pattern of said selector means.

2. In a distributing system, in combination, a conveyor, a load carrier entrained by said conveyor, a plurality of load-receiving stations each provided with a controller in the path of said carrier, selector means on said carrier adjustable into a plurality of different patterns, said controller including test means pre-set into a pattern matching one of the possible patterns of said selector means, a movable support for said test means, mechanism at each of said stations responsive to the passage of said carrier for momentarily displacing said support toward said carrier in a position of operative alignment of said selector means with said test means, said selector means forming at least one abutment bearing upon said test means in the absence of a matching condition between the selector-means and test-means patterns, thereby arresting said support in an inoperative position, detent means on said carrier adapted to hold a load thereon, and release means at said controller operable by said support upon an advance thereof toward said carrier beyond said inoperative position for tripping said detent means into a load-releasing position.

3. The combination according to claim 2 wherein said support comprises a swingable frame pivotally mounted below the path of said carrier for pivotal movement about a substantially horizontal axis.

4. The combination according to claim 3, further comprising biasing means at each station urging said frame toward said path, and cam means on said carrier deflecting said frame away from said path against the force of said biasing means, said cam means being provided with a discontinuity for enabling said biasing means to complete the approach of said test means in said position of alignment.

5. The combination according to claim 2 wherein said carrier has a sloping load-bearing surface, said detent means comprising a swingable member projecting above said surface and latch means normally bearing upon said member in a sense preventing pivotal movement thereof out of a load-engaging position, said release means including a projection on said support engageable with said latch means for inactivating same.

6. The combination according to claim 5 wherein each station has a receiving surface substantially aligned with said load-bearing surface, further comprising control means linked with said support and depressible by a load on said receiving surface for preventing the advance of said support beyond said inoperative position.

7. The combination according to claim 2 wherein said selector means comprises a plurality of individually displaceable elements arrayed in at least one row extending in the direction of carrier motion, said test means comprising a like number of similarly arrayed co-operating elements selectively removable from their array.

8. The combination according to claim 7 wherein said test means further comprises a supporting rod having said co-operating elements hingedly mounted thereon and extending substantially horizontally in the direction of carrier movement.

9. The combination according to claim 7 wherein each of said displaceable elements is shiftable between a retracted and an extended position, further comprising spring means urging each of said displaceable elements into its retracted position, holding means for retaining any of said displaceable elements in said extended position against the force of said spring means, and lock-out means for momentarily inactivating said holding means upon the shifting of any retracted element into its extended position, thereby preventing the simultaneous retention of more than one of said displaceable elements in said extended position.

10. The combination according to claim 2 wherein said selector means comprises a plurality of individually displaceable elements arrayed in two parallel rows extending in the direction of carrier motion, said test means comprising a like number of co-operating elements similarly arrayed in two parallel rows and selectively removable from alignment with the other elements of the respective row.

11. The combination according to claim 10 wherein each of said rows consists of ten elements.

12. In a distributing system, in combination, a conveyor, a load carrier entrained by said conveyor, a plurality of load-receiving stations each provided with a controller in the path of said carrier, a selector on said carrier comprising a plurality of elements arrayed in at least one row extending in the direction of carrier motion, said elements being individually displaceable from a retracted into an extended position, said controller including means forming a test pattern positioned for co-operation with at least one extended selector element in a predetermined position of alignment between said selector and said controller, a movable support for said test pattern, mechanism at each of said stations responsive to the passage of said carrier through said position of alignment for momentarily displacing said support toward said carrier, said test-pattern-forming means being adapted to occupy an operative position on encountering a matchingly adjusted selector in the course of such displacement, detent means on said carrier adapted to hold a load thereon, release means at said controller engageable with said detent means during passage of said carrier for tripping said detent means into a load-releasing position, and actuating means on said support responsive to said test-pattern-forming means occupying said operative position for making said release means effective to trip said detent means.

13. In a distributing system, in combination, a conveyor, a load carrier entrained by said conveyor, a plurality of load-receiving stations each provided with a controller in the path of said carrier, a selector on said carrier comprising a plurality of elements arrayed in a plurality of parallel rows extending in the direction of carrier motion, said elements being individually displaceable from a retracted into an extended position, said controller including means forming a test pattern positioned for co-operation with an extended selector element of each row in a predetermined position of alignment between said selector and said controller, a movable support for said test pattern, mechanism at each of said stations responsive to the passage of said carrier through said position of alignment for momentarily displacing said support toward said carrier, said test-pattern-forming means being adapted to occupy an operative position on encountering a matchingly adjusted selector in the course of such displacement, detent means on said carrier adapted to hold a load thereon, release means at said controller engageable with said detent means during passage of said carrier for tripping said detent means into a load-releasing position, and actuating means on said support responsive to said test-pattern-forming means occupying said operative position for making said release means effective to trip said detent means.

14. The combination according to claim 13 wherein said selector elements comprise two rows of pushbuttons provided with numerical units and tens markings, respectively.

15. In a distributing system, in combination, a conveyor, a load carrier entrained by said conveyor, a plurality of load-receiving stations each provided with a controller in the path of said carrier, a selector on said carrier comprising a plurality of first elements arrayed in a plurality of parallel rows, said elements being individually displaceable from a retracted into an extended position, said controller including a plurality of second elements and common support means therefor, said second elements forming a test pattern matching one of the possible patterns of adjustment of said first elements, pattern-comparing means for ascertaining the existence of a matching condition in a predetermined position of alignment between said selector and said controller, mechanism at each of said stations for momentarily displacing said support toward said carrier in said position of alignment for rendering said pattern-comparing means effective, detent means on said carrier adapted to hold a load thereon, and release means at said controller engageable with said detent means in said position of alignment for tripping said detent means into a load-releasing position, said release means being actuatable by said pattern-comparing means in the presence of said matching condition.

16. The combination according to claim 15 wherein said controller is positioned underneath the path of said carrier, said selector further comprising a plurality of rows of pushbuttons for individually depressing said first elements toward the controller, said pushbuttons being provided with digital markings indicating a selected station in a decimal code.

17. The combination according to claim 15 wherein said rows extend in the direction of carrier movement, said second elements being respectively aligned with said rows during the passage of said carrier.

18. The combination according to claim 17 wherein said second elements equal said first elements in number and relative location, said second elements being individually displaceable to establish said test pattern.

19. In a distributing system, in combination, a conveyor, a plurality of load carriers entrained by said conveyor, a plurality of load-receiving stations each provided with a controller in the path of each of said carriers, a selector on each of said carriers, comprising a plurality of first elements arrayed in a plurality of parallel rows, said elements being individually displaceable from a retracted into an extended position, said controller including a plurality of second elements and common support means therefor, said second elements forming a test pattern matching one of the possible patterns of adjustment of said first elements, pattern-comparing means for ascertaining the existence of a matching condition in a predetermined position of alignment between said selector and said controller, mechanism at each of said stations for momentarily displacing said support toward said carrier in said position of alignment for rendering said pattern-comparing means effective, detent means on each of said carriers adapted to hold a load thereon, and release means at said controller engageable with said detent means in said position of alignment for tripping said detent means into a load-releasing position, said release means being actuatable by said pattern-comparing means in the presence of said matching condition.

20. In a distributing system, in combination, a conveyor, a load carrier entrained by said conveyor, a plurality of load-receiving stations each provided with a controller in the path of said carrier, selector means on said carrier adjustable into a plurality of different patterns, said controller including test means pre-set into a pattern matching one of the possible patterns of said selector means, a movable support for said test means underneath said path, mechanism at each of said stations responsive to the passage of said carrier for moving said support upwardly toward said carrier, each of said stations further having a receiving surface for a load discharged from said carrier, said support having an extension projecting upwardly from said receiving surface for depression by a load positioned thereon whereby said support is prevented from approaching said carrier in the presence of a load on said surface, pattern-comparing means operative upon the completion of said approach for ascertaining the existence of a matching condition between said selector-means and test-means patterns, detent means on said carrier adapted to hold a load thereon, and release means at said controller engageable with said detent means for tripping said detent means into a load-releasing position under the control of said pattern-comparing means in the presence of said matching condition.

References Cited in the file of this patent

UNITED STATES PATENTS 2,919,790 Winz _____ Jan. 5, 1960

FOREIGN PATENTS 205,923 Austria _____ Oct. 26, 1959